Nov. 19, 1968   A. D. BUNYARD   3,411,409
PISTON-RACK OPERATED SHAFT

Filed Feb. 24, 1967   6 Sheets-Sheet 1

INVENTOR
ALAN DONALD BUNYARD
By Shoemaker and Mattare
ATTYS.

Nov. 19, 1968  A. D. BUNYARD  3,411,409
PISTON-RACK OPERATED SHAFT
Filed Feb. 24, 1967  6 Sheets-Sheet 2

INVENTOR
ALAN DONALD BUNYARD
By Shoemaker and Mattare
ATTYS.

Nov. 19, 1968    A. D. BUNYARD    3,411,409
PISTON-RACK OPERATED SHAFT
Filed Feb. 24, 1967    6 Sheets-Sheet 3

INVENTOR
ALAN DONALD BUNYARD
By Shoemaker and Mattare
ATTYS.

INVENTOR
ALAN DONALD BUNYARD
By Shoemaker and Mattare
Attys.

United States Patent Office 3,411,409
Patented Nov. 19, 1968

3,411,409
PISTON-RACK OPERATED SHAFT
Alan Donald Bunyard, Burrell Road, Haywards
Heath, Sussex, England
Filed Feb. 24, 1967, Ser. No. 618,539
Claims priority, application Great Britain, Mar. 5, 1966,
9,733/66; Feb. 2, 1967, 5,052/67
18 Claims. (Cl. 91—1)

ABSTRACT OF THE DISCLOSURE

Piston-rack type actuator in which the compressed air or gas is supplied either to the central chamber or to the two end chambers, defined by two pistons located in a cylinder, in order to cause the two pistons to move towards or away from each other and thereby to rotate an output shaft by means of their integral racks meshing with a pinion on the shaft. Each piston is mounted for its reciprocating movements on one of two parallel guides both of which extend through each piston and serve to limit the extent of cocking or skewing of one or both of the pistons and thus to prevent fouling of the cylinder thereby.

---

This invention relates to piston-rack rotary actuators.

A disadvantage of a piston-rack rotary actuator which includes a pair of pistons adapted to reciprocate in opposite directions along a pair of opposed cylinders is that the pistons have a tendency to cock or turn in the cylinder thereby jamming and/or damaging the radially inner surface or surfaces of the cylinders and thus in time the seals.

Another disadvantage of rotary actuators (not necessarily of the piston-rack type) which use for example air as the operating medium is that the moving parts are not easy to lubricate because the lubricant tends to be displaced by the air pressure with the result that the pistons seize in the cylinders.

Accordingly the present invention consists in a pneumatically operated piston-rack rotary actuator which includes two pistons adapted for reciprocating movements in opposite directions along cylindrical chambers under the influence of fluid pressure, said pistons having integral racks meshing with a common pinion which is connected to an output shaft of said actuator, and each of said pistons being mounted, on at least one bush made of a material having a low coefficient of friction, upon one of two parallel guide members both of which extend through said pistons.

Preferably, said cylindrical chambers constitute opposed parts of a continuous cylindrical chamber.

Further, it is preferred that each rack is integral with an axially extending sleeve which forms a part of said piston and which extends around and along one of said parallel guide members, said one bush of said material being interposed between said sleeve and said guide member.

It is further preferred that (for each of said two pistons) the guide member which is engaged by the sleeve of one of said two pistons, with the interposition of at least one bush of said material between said sleeve and said guide member, extends also through an aperture in the other of said two pistons with a clearance between said guide member and said piston which is sufficient to accommodate any cocking of said other piston and resultant deflection of said guide member which may occur when said pistons move towards or away from one another.

In one preferred embodiment, it is further preferred that each guide member includes gas inlet means and gas outlet means, axial movement of a valve member in one direction opening the gas inlet means and closing the gas outlet means whereas axial movement of said valve member in the opposite direction restricts the gas inlet means and opens the gas outlet means. It is further preferred that the valve member is a rod and that the guide member is a tube, the rod and the tube being concentrically arranged. Again, it is preferred that the gas outlet means of each tube be opened by a mechanical, electrical, electro-magnetic, hydraulic or pneumatic device or by a device which is a combination of two or more thereof.

In a first alternative embodiment, only one guide member need be provided with gas inlet and gas outlet means, return of each piston to a rest position being effected by a compression spring or springs, venting of the pressure medium to atmosphere or to a source of said pressure medium being effected either by an axially movable valve member within said one guide member or by valve means exterior to said rotary actuator. Preferably, said valve member is a rod and said guide member is a tube, the rod and the tube being concentrically arranged. Further, it is preferred that the gas outlet means of the tube be opened by a mechanical, electrical, electro-magnetic, hydraulic or pneumatic device or by a device which is a combination of two or more thereof.

The preferred form of said first alternative embodiment consists in a pneumatically operated piston-rack rotary actuator wherein a cylindrical body, open at each end thereof, is adapted to be closed by end caps into which the ends of said guide members extend, said end caps being secured in position by fixing means which are adapted to engage said ends of said guide members, closure of said cylindrical body by said end caps defining a continuous cylindrical chamber along two axially aligned (or opposed) parts of which said pistons are intended to move away from one another towards said end caps under the influence of a fluid under pressure and to move towards one another away from said end caps (when said fluid pressure is no longer applied to said pistons) under the influence of the power which becomes stored in a plurality of return springs compressed as a result of said movement of the pistons towards the respective end caps. said plurality of springs consisting of one set of springs associated with each of said end caps and each spring of each set having one end thereof in engagement with an axially extending locating means in or on the end cap and having the other end thereof in pressure relationship with the respective piston.

Preferably, said axially extending locating means consists of an axially extending recess in said end cap. Alternatively, said axially extending locating means consists of an axially extending boss on said end cap.

Again, preferably, each spring of each set consists of a single helical compression spring. Alternatively, each spring of each set consists of a pair of helical compression springs nested one within the other, the helix of said one spring of said pair of springs being opposite in sense to the helix of said other spring of said pair of springs.

In a second alternative embodiment each guide member includes gas inlet means and gas outlet means, the gas being supplied to the gas inlet means of one of said guide members at a time by way of a conduit and under the control of a directional valve which also vents to atmosphere or to a source of said gas the other of said guide members.

It is desirable for some users of rotary actuators also to be able to obtain some indication (perhaps audible or visible) of the state or condition of the actuator. This is particularly the case where the actuators are used to open and shut ball valves in an installation (for example an oil refinery) having great lengths of piping, control of the installation being exercised from one location which is remote from said actuators.

According to this aspect, the present invention consists in a pneumatically operated piston-rack rotary actuator as set out in the second paragraph hereof, wherein the fluid pressure under the influence of which the pistons are moved in a first sense along said chambers to first end positions thereof is permitted by virtue of the condition of a first valve to become reduced at the same time as fluid pressure is permitted by virtue of the condition of a second valve to influence the pistons to move in a second sense (opposite to said first sense) along said chambers to second end positions thereof, the state or condition of said output shaft being made known by indicating means operable in dependence upon which end position of said first and second end positions of said pistons are occupied thereby.

Preferably, said first valve and said second valve are constituted by a spool valve of which the spool is displaceable along a cylinder which has axially separated ports therein and which is accommodated within a bore which is both coaxial with said chambers and axially separated therefrom, said bore communicating with at least five passageways; displacement of said spool in a first sense along said cylinder both permitting said fluid pressure to be so applied by way of a first passageway and a second passageway of said five passageways to said pistons as to cause said pistons to be moved in said first sense along said chambers to said first end positions thereof permitting the fluid presure which had previously caused said pistons to occupy said second end positions thereof to be reduced by way of a third passageway and a fourth passageway of said five passageways; and displacement of said spool in a second sense (opposite to said first sense of displacement thereof) both permitting said fluid pressure to be so applied by way of said first passageway and said third passageway of said five passageways to said pistons as to cause said pistons to be moved in said second sense along said chambers to said second end positions thereof and permitting the fluid pressure which had previously caused said pistons to occupy said first end positions thereof to be reduced by way of said second passageway and the fifth passageway of said five passageways. Preferably, the fluid employed is a gas or gaseous mixture or compound (for example air) said fluid pressure being reduced by exhaust to atmosphere or to a source of said gas, gaseous mixture or compound.

Preferably, displacement of said spool in each of said first and second senses of displacement thereof along said cylinder is effected by a solenoid.

Preferably, again, said indicating means consists of a pair of switch devices separated from one another axially of said actuator and operated by an operating means carried by one of said pistons. In a preferred embodiment, said indicating means consists of visible means (for example a pair of lights). In an alternative embodiment, said indicating means consists of a device which when energised produces an audible signal to indicate either of the states or conditions of said output shaft. In a further alternative embodiment, said indicating means consists of devices (for example a bell and a buzzer) each of which when energised indicates one state or condition of said output shaft.

The present invention will now be more particularly described with reference to the accompanying drawings, in which.

Figure 1:
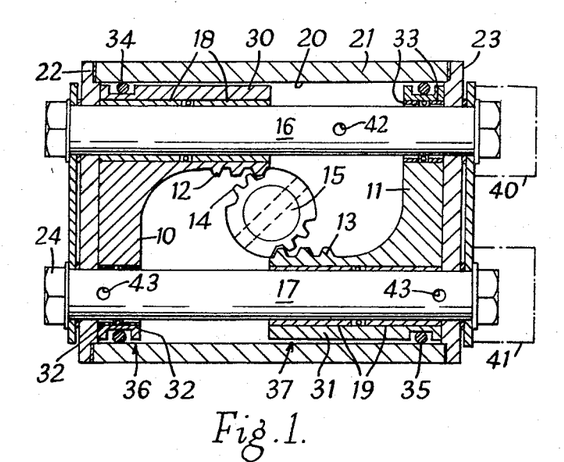
FIGURE 1 illustrates, in longitudinal axial section, one embodiment of a pneumatically operated piston-rack actuator constructed in accordance with the present invention and including parallel guide members.

In FIGURE 1, there is illustrated a pneumatically-operated piston-rack rotary actuator which includes two pistons 10, 11 adapted for reciprocating movements in opposite directions along cylindrical chambers under the influence of fluid pressure, said pistons having integral racks 12, 13, respectively, meshing with a common mutilated pinion 14 which is connected or keyed in a conventional manner to an output shaft 15 of said actuator. Said pistons 10, 11 are mounted upon tubular parallel guide members 16, 17 on bushes 18, 19, respectively, made of a material having a low coefficient of friction. The cylindrical chambers, in the embodiment illustrated are coaxial, being opposed parts of a continuous cylindrical chamber 20. The chamber 20 is defined by a cylindrical body 21 and end caps 22, 23, the end caps being spaced apart and the assembly being held together by threaded nuts 24 screwed into the opposite ends of each guide member 16, 17.

It will be seen that each bush 18, 19 is constituted by a pair of axially separated bushes, a sealing ring (O-ring) being disposed between said axially separated bushes. Said bushes are preferably made of "Delrin" but other materials may be employed, for example, a silicone rubber, PTFE-covered rubber or perhaps PTFE.

The integral racks 12, 13 are formed in axially extending sleeves 30, 31 which form parts of said pistons 10, 11.

It will further be noted that the pistons 10, 11 not only have the guide members 16, 17 extending through the sleeves 30, 31 thereof, respectively, but also have the other of the guide members 16, 17 extending through apertures in which are located further axially separated bushes 32, 33 of for example brass or other suitable material, said axially separated bushes having sealing rings therebetween. There are clearances (preferably but by no means essentially of the order of one sixty-fourth of one inch) between said brushes 32, 33 and the entire circumferences of the guide members 16, 17. The bushes 32, 33 are preferably a drive fit in the apertures in the pistons 10, 11.

Other sealing rings 34, 35 are provided in seats therefor.

It will be noted that there are also clearances (preferably but by no means essentially of the order of one sixty-fourth of one inch) between the sleeves 30, 31 on the one hand and between the entire circumferences of the pistons proper, namely, the pistons 10, 11 as distinct from their sleeves 30, 31. These clearances are exemplified by the two clearances 36, 37 indicated in FIGURE 1.

Any tendency of the pistons 10, 11 to cock in their cylindrical chambers on account of the offset racks 12, 13 is counteracted by the parallel guide members 16, 17 which extend through the pistons and their respective sleeves and apertures. However, if there is cocking of said pistons with resultant deflection of the guide members 16, 17 or one of said guide members 16, 17, the clearances between the bushes 32, 33 prevents any part of the pistons 10, 11 scoring the respective guide member or members 16, 17. Further, the clearances 36, 37 prevent the pistons fouling the radially inner surface of the body 21.

Figure 2:
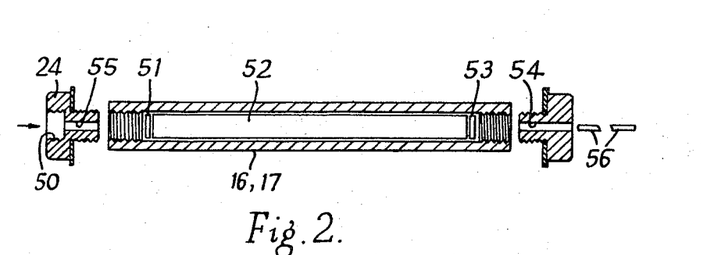
FIGURE 2 illustrates an exploded view of the parts which may be applied to either of said parallel guide members) which together constitute valve means in said actuator.

Diagrammatically illustrated in FIGURE 1 are devices 40, 41 which are provided to actuate the mechanism now to be described, such actuation being effected, for example, by mechanical, electrical, electro-magnetic, hydraulic or pneumatic devices. It will be convenient to assume, however, that each device 40, 41 is a solenoid. It will be seen that each guide member 16, 17 is a tube (FIGURE 2) which is provided with a radial hole 42 in the case of member 16 and with two radial but axially separated holes 43 in the case of member 17. In FIGURE 2, which is an exploded view of the essential parts, there is illustrated one tube which could be either of the guide members 16, 17 (holes 42, 43 are not illustrated) and the nuts 24 one of which is threaded at 50 for the accommodation of the screwed end of a hose (not illustrated) for supplying the gas (for example air) to operate the rotary actuator. A sealing disc 51 is provided at one end of a valve member 52 in the form of a rod and a further sealing disc 53 (which preferably, but not essentially, has a centrally located hole therein and would, therefore, more correctly be called an annulus 53) is provided at the other end of the rod. The other nut 24 has a smooth bore 54 similar to the smooth bore 55 of the first-mentioned nut. Lastly, a rod 56 is located in the bore 54 and is of such length as to project into the solenoid 40, 41.

When the air pressure is applied to the disc 51 through the bore 55, the rod 52 moves to the right and, in so doing, obturates the bore 54 through the intermediary of the disc 53. Conversely, when the solenoid is energised, the rod or plunger 56 is caused to move to the left as seen in FIGURE 2, thereby opening the bore 54 to the air under pressure and thereby also at least restricting the bore 55 by moving the rod 52 to the left.

Applying this mode of operation to FIGURE 1, it will be seen that the air under pressure will, in the next cycle of the actuator, be vented by way of the hole 42 and the bore 54 in the nut 24 from the space between the two pistons when the solenoid 40 is energised, energisation of the solenoid 40 being simultaneous with or after de-energisation of the solenoid 41. Air under pressure applied to the disc 51 in the tube or guide member 17 will cause the pistons 10, 11 to move towards one another because the bore 54 in the nut 24 at the right-hand end of the tube 17 will be sealed against escape of air by the rod 52 and the disc 53. The air under pressure reaches the piston faces by way of the holes 43 and movement of the pistons is stopped either when the free end of the respective sleeve 30, 31 makes contact with the other piston or beforehand (for example when a valve being operated by the actuator reaches its own end stop).

The disc 51 may be omitted since it is not essential, when venting any part of the actuator, to seal the gas inlet means; it is sufficient merely to restrict drastically the flow of compressed air through the bore 55 into the respective one of the guide members 16, 17.

Figure 3:
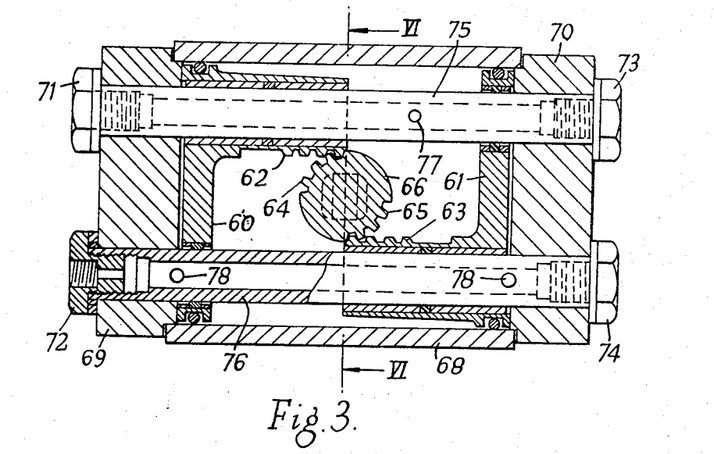
FIGURE 3 illustrates diagrammatically, in longitudinal axial section, a second embodiment of a pneumatically operated piston-rack actuator in accordance with the present invention.
Figure 4:
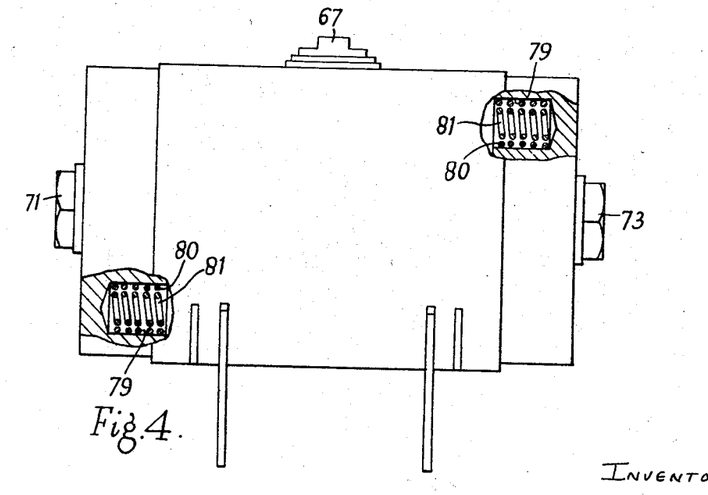
FIGURE 4 illustrates, in side elevation, partly in section, the actuator illustrated in FIGURE 3 which includes pistons movable away from one another under the influence of a pressure medium and movable towards one another under the influence of compression springs.

Referring to FIGURES 3 to 6, there is illustrated therein a pneumatically operated piston-rack actuator which includes two pistons 60, 61 having integral racks 62, 63, respectively, meshing with sets of teeth 64, 65, respectively, said teeth being formed in a bar or rod 66 which constitutes the output shaft of the actuator and of which one end 67 is shaped in the manner best seen in FIGURES 2, 3 and 4.

The cylindrical chambers along which the pistons 60, 61 move are defined by a cylindrical body 68 closed by end caps 69, 70, said end caps being secured to said body by bolts 71, 72, 73, 74 which are screwed into the threaded ends of tubular guide members 75, 76. The bolt 71 is provided with a screw-threaded bore (not illustrated) to permit the connection thereto of one end of a pressure hose or pipe (not illustrated) the other end of which is connected to a source of compressed air. The guide member 75 has a radial hole 77 which establishes communication between the bore in the tubular guide member 75 and the space between the pistons 60, 61. The guide member 76, on the other hand, is provided with two axially separated holes 78 which establish communication between the bore in the tubular guide member 76 and the spaces which are located between the axially outer faces of the pistons 60, 61 and the axially inner faces of the end caps 69, 70, respectively.

Each end cap is provided with a plurality of axially extending recesses 79, each recess being adapted to accommodate one end of at least one helical compression spring. In fact, in the embodiment illustrated in FIGURE 2, each recess 79 accommodates one end of each of two compression springs 80, 81, nested one inside the other, the helix of one spring preferably (but by no means essentially) being wound in a sense opposite to that in which the helix of the other spring is wound.

The operation of the actuator described above with reference to FIGURES 3 to 6, such description having omitted explanation of details already described above with reference to FIGURE 1, is as follows:

Air under pressure is admitted into the space between the pistons 60, 61 by way of the pressure hose or pipe hereinbefore referred to, the bore of the member 75 and the hole 77 and the pistons 60, 61 move to the positions thereof which have been illustrated in FIGURE 3. Such movements of said pistons together turn the output shaft 66 and compress the various springs 80, 81 and also displace air through the holes 78 in the member 76, said displaced air leaking to atmosphere by virtue of the tolerances to which the various parts of the actuator are made. When the springs 80, 81 are to be permitted to move the pistons 60, 61 axially towards one another, the air under pressure which has been applied to said pistons by way of said hole 77, the valve (not illustrated) which is exterior to said actuator and which is connected in the pressure hose or pipe hereinbefore referred to is manipulated to permit exhaust to atmosphere of said compressed air by way of said hole 77, the bore of the member 75 and said hose or pipe. The function of the holes 78 in this part of the cycle of operation of the actuator is the reverse of that previously described.

Figures 5, 6, 8:
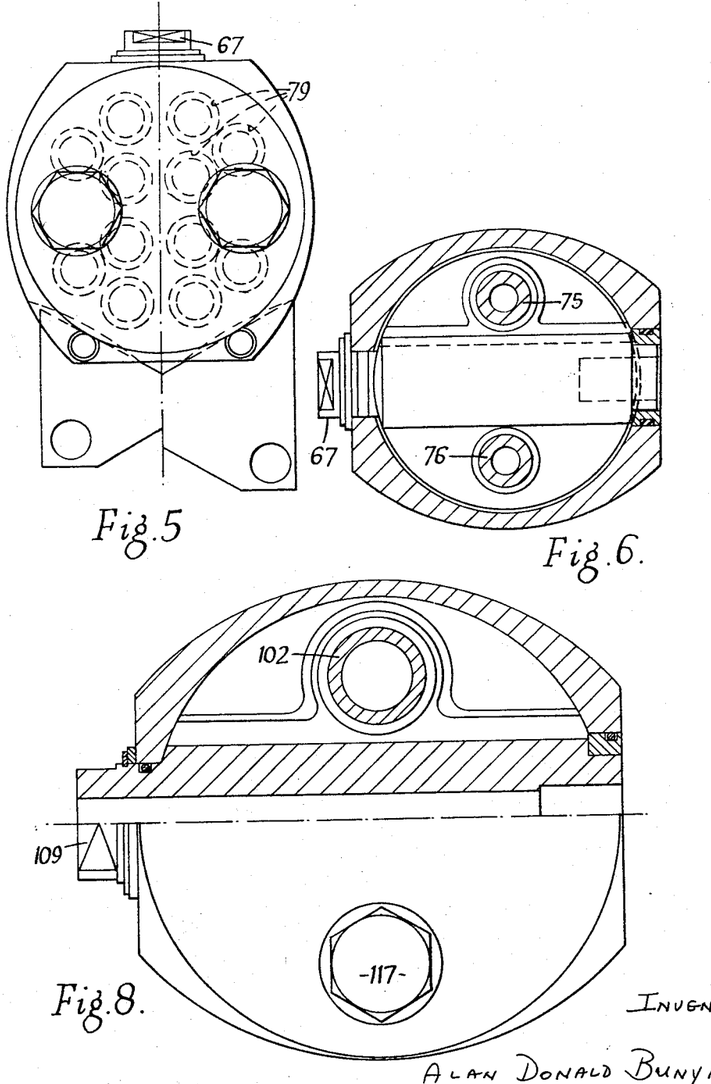
FIGURE 5 illustrates an end elevation of the actuator illustrated in FIGURE 4 as seen from the right-hand end thereof.
FIGURE 6 illustrates diagrammatically, a section taken along the line VI–VI in FIGURE 3.
FIGURES 7 and 8 illustrate, respectively, a longitudinal axial section and a transverse section on a plane containing the rotational axis of the actuator output shaft, of a third embodiment of a pneumatically operated piston-rack actuator in accordance with the present invention.
Figure 7:
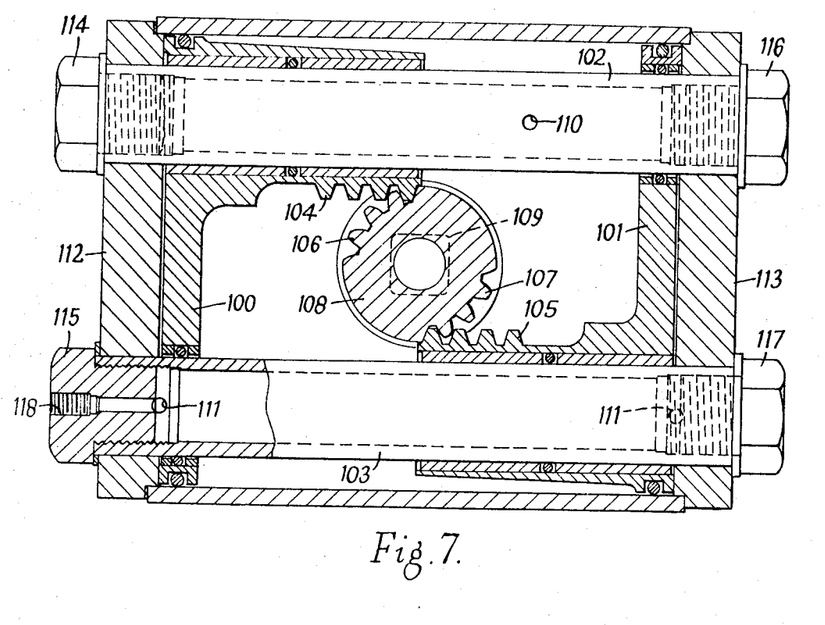

Referring to FIGURES 7 and 8, there is illustrated therein an actuator which includes pistons 100, 101 mounted upon tubular guide members 102, 103 and having integral racks, 104, 105 of which the respective teeth mesh with teeth 106, 107, respectively, formed in a rod or bar 108 which constitutes the output shaft of the actuator and which has a square end 109. The guide member 102 is provided with a radial hole 110 which communicates with the bore of the said tubular member 102 and with the space between thhe axially inner faces of said pistons whereas the guide member 103 is provided with two radial holes 111 which are axially separated from one another by a distance substantially equal to the distance between the axially inner faces of end caps 112, 113. Each of said holes 111 is in communication with the bore of the said tubular member 103 and with the space between the axially outer face of the respective one of said pistons and the axially inner face of the respective one of said end caps.

The end caps 112, 113 are secured in position by bolts 114, 115, 116, 117 of which the bolts 114, 115 are provided with screw-threaded bores 118 which communicate with the bores of said tubular members 102, 103. Pressure hoses or pipes (not illustrated) are connected to said bores 118 and to a three-way valve (not illustrated) which is operable to control not only the supply to one of said guide members 102, 103 of compressed air in order to effect not only axial movement of the pistons in the required sense but also the exhaust of compressed air from the other of said guide members. Specifically, with the pistons in the end positions thereof illustrated in FIGURE 7, said three-way valve is operated in order simultaneously to supply compressed air to the guide member 103 and to connect the guide member 102 to atmosphere, thereby effecting axial movement of the pistons 100, 101 towards one another away from the end caps 112, 113 and also effecting rotation in a clockwise direction (as seen in FIGURE 7) of the output shaft 108. Subsequent axial movement of said pistons away from one another towards said end caps is effected by operation of said three-way valve in order simultaneously to supply compressed air to the guide member 102 and to connect the guide member 103 to atmosphere, thereby effecting anti-clockwise rotation (as seen in FIGURE 7) of said output shaft.

Figure 9:
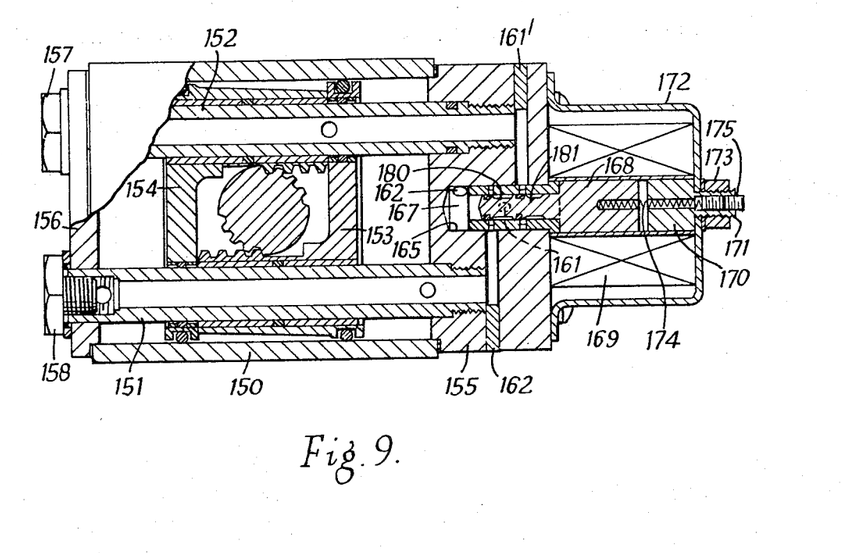
FIGURE 9 illustrates, in longitudinal axial section, a fourth embodiment of a pneumatically operated piston-rack actuator in accordance with the present invention, including a solenoid-operated indicating means adapted to indicate the state or condition of the actuator output shaft.
Figure 10:
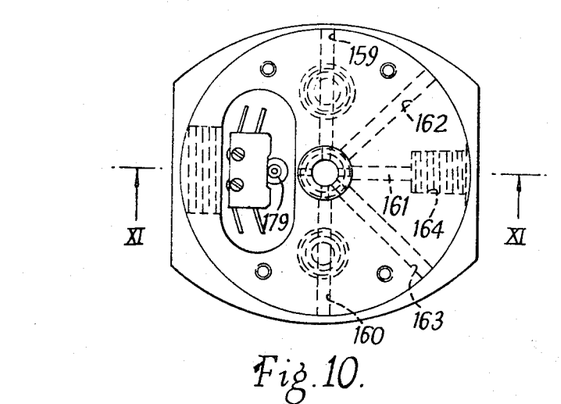
FIGURE 10 illustrates an end elevation of the right-hand end of the actuator illustrated in FIGURE 9 with the solenoid and the solenoid cover removed; and in FIGURE 10, the section having been taken along the FIGURE 11 illustrates diagrammatically a detail, in section, of that end of the actuator which is illustrated in FIGURE 10, the section having been taken along the line XI—XI in FIGURE 10.
Figure 11:
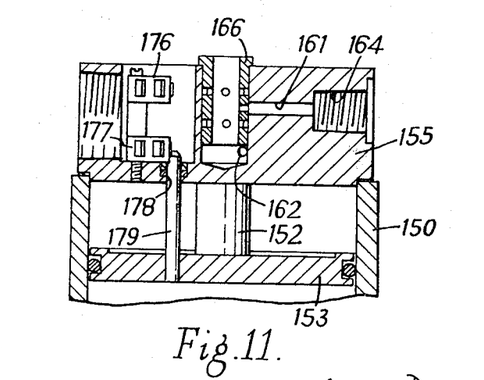

Referring to FIGURES 9, 10 and 11, there is illustrated therein an actuator which includes a cylindrical body 150, tubular guide members 151, 152, pistons 153, 154 and end caps 155, 156. The pistons have integral racks of which the teeth mesh with sets of teeth formed in a rod or bar which constitutes the output shaft of the actuator and the guide members 151, 152 are respectively provided with two axially separated holes and with a hole, all as and for the purpose or purposes hereinbefore described with reference to FIGURES 3 to 8.

The end cap 156 is secured in position by bolts 157, 158 which screw into the screw-threaded ends of the tubular members 151, 152 and blank off said members at those respective ends. The end cap 155 is provided with five radial passageways 159 to 163, of which the passageways 159, 160 are in communication with the bores of the guide members 152, 151, respectively, and are blanked off at their radially outer ends by plugs 161', 162', respectively, and are in communication at their radially inner ends with an axially extending bore 165 which is coaxial with the chambers along which the pistons 153, 154 are adapted to be moved. The passageway 161 communicates, at its radially inner end, with said bore 165 and, at its radially outer end with a screw-threaded bore 164 adapted to accommodate the screw-threaded male part of a pressure hose or pipe (not illustrated) which is connected to a source of compressed air. The passageways 162, 163 communicate at their radially inner ends with said bore 165 and are open to the atmosphere at their radially outer ends.

A cylinder or bush 166, having two axially separated sets of radial holes therein, each set consisting of four holes having the centres of corresponding sections 90° apart and lying in a single radial plane, is located or housed in said bore 165 and the cylinder or bush 166 accommodates the spool 167 of a spool valve. Said spool is integral with an element 168 of larger diameter than that of the spool, said element 168 being adapted to act as (and being hereinafter referred to as) the armature or plunger of a solenoid which consists of a solenoid coil 169, a sleeve 170 having an exteriorly screw-threaded portion 171 extending through a solenoid cover 172 and held in position on said cover by a nut 173. The armature 168 is urged into the position thereof illustrated in FIGURE 9 by a compression spring 174, the force exerted by which is adjustable by rotation, in one sense or the other, of a grub screw 175.

The end cap 155 carries two double-throw microswitches 176, 177 and is apertured at 178 so as to permit the extension therethrough of an operating rod 179 which is carried by the piston 153. Each switch 176, 177 is provided with two pairs of terminals and the switches are so wired, in this preferred embodiment, as sequentially to light a red lgiht, an amber light and a green light, and vice versa, in the following circumstances, namely, the red light will be lit as a result of one pair of contacts of switch 177 being made when the pistons 153, 154 are in their first end positions (having been moved axially of in a first sense towards one another away from the end caps), the red light will be turned out and the amber light will be lit when the rod 179 causes the switch 177 to be thrown to make the other pair of contacts thereof as the pistons 153, 154 begin their axial movements away from one another towards the end caps, and the amber light will be turned out and the green light will be lit (towards the end of said axial movements) as a result of the switch 176 being thrown by said rod 179 to break one pair of its contacts and thereby to make the other pair of its contacts. Reverse axial movements of the pistons will light up the lights in the reverse order.

The operation of the actuator (ignoring the sequence of lighting of the red, amber and green lights which has just been explained) is as follows:

In the positions of the pistons illustrated in FIGURE 9, compressed air enters the cylinder or bush 166 and is in communication with a first annular space provided by an axial portion 180 of the spool 167 which is of reduced diameter. Said first annular space is in communication with the passageway 160 by way of the respective radial hole in said bush 166 and, therefore, the pistons 153, 154 are maintained in the end positions thereof which are illustrated. It will also be noted that the spool is provided with another axial portion 181 which is of reduced diameter and which therefore provides a second annular space, said second annular space being in communication both with the passageway 159 and with the passageway 163 with the result that the space between the pistons 153, 154 is exhausted to atmosphere.

When the solenoid is energised, the armature 168 is moved to the right (as seen in FIGURE 9) against the influence of the spring 174 with the result that the spool 167 is displaced in a second sense and such displacement places the first annular space in communication with the passageway 159, seals the passageway 163 against communication with either of the passageways 159, 160, and places the passageway 162 in communication with the passageway 160. This means that the fluid pressure previously applied to the axially outer faces of the pistons 153, 154 is exhausted to atmosphere at the same time as fluid pressure is applied to the axially inner faces of the pistons, with the result that the pistons will move axially in a second sense from the first end positions thereof (illustrated in FIGURE 9) to the second end positions thereof. Subsequent axial movement of said pistons in a first sense to restore said pistons to the first end positions thereof is achieved by deenergising the solenoid in order to permit the spool 167 under the influence of the spring 174 to be displaced in a first sense back to the position thereof illustrated in FIGURE 9.

It will be apparent that, instead of three lights, either a less number or a greater number of lights can be used possibly with a less or a greater number of switches. Further, devices producing audible indications may be used instead of or as well as lights.

Some of the advantages obtained with the constructions of piston-rack rotary actuator described above with reference to the drawings are minimal lubrication (apart from initial greasing), smaller overall length than some of the models of rotary actuator at present on the market, compact design for any given power output with an efficiency of at least 75%, and the elimination (or at least a significant reduction in degree) of the disadvantages referred to at the beginning hereof.

What I claim as my invention and desire to secure by letters patent of the United States is:

1. A pneumatically operated piston-rack rotary actuator which includes means defining two chambers, two parallel guide members having a fixed mounting relationship with said means, a rotatably mounted output shaft located between said two chambers, gear teeth carried by said shaft, a piston located in each of said two chambers, a toothed rack connected to each piston, the teeth of each rack being in permanent engagement with some of the gear teeth carried by said shaft, one of said pistons being mounted for reciprocating movements in opposite directions upon one of said guide members and the other of said pistons being mounted for reciprocating movements in opposite directions upon the other of said guide members, means made of a material having a low coefficient of friction and disposed between said pistons and the respective guide members upon which said pistons are mounted for said reciprocating movements, said one of said guide members also extending through said other of said pistons and said other of said guide members also extending through said one of said pistons, and means permissive of the application of fluid pressure to said pistons to effect simultaneous movements of said pistons along the respective chambers and consequent rotation of said shaft.

2. An actuator as claimed in claim 1, wherein said chambers constitute opposed parts of a continuous chamber.

3. An actuator as claimed in claim 1, wherein an axially extending sleeve forms a part of each piston and encircles the respective guide member, means made of a material having a low coefficient of friction, said sleeve being integral with the respective rack.

4. An actuator as claimed in claim 1, wherein said one of said guide members extends through said other of said pistons with a clearance sufficient to accommodate any cocking of said other of said pistons and resultant deflection of said one of said guide members which may occur when said shaft is rotated, and wherein said other of said guide members extends through said one of said pistons with a clearance sufficient to accommodate any cocking of said one of said pistons and resultant deflection of said other of said guide members which may occur when said shaft is rotated.

5. An actuator as claimed in claim 4, wherein an axially movable valve member and gas inlet means and gas outlet means are provided in each guide member, said valve member being movable in one direction of movement thereof to open the gas inlet means and to close the gas outlet means and being movable in the opposite direction of movement thereof to restrict the gas inlet means and to open the gas outlet means.

6. An actuator as claimed in claim 5, wherein the valve member is a rod and wherein the guide member is a tube, the rod and the tube being concentrically arranged, movement of the rod axially of the tube being remotely controllable.

7. An actuator as claimed in claim 4, wherein an axially movable valve member and gas inlet and gas outlet means are provided in only one guide member, spring means located between each of said pistons on the one hand, and said means defining said chambers on the other hand, rotation of said shaft in one direction of rotation thereof under the influence of said fluid pressure applied to said pistons compressing said spring means and storing power therein, said power applied to said pistons under the influence of reduced fluid pressure rotating said shaft in the opposite direction of rotation thereof, said valve member being movable in one direction of movement thereof to open the gas inlet means and to close the gas outlet means and thereby to permit the application of said fluid pressure to said pistons, and said valve member being movable in the opposite direction of movement thereof at least to restrict the gas inlet means and thereby to permit the compressed spring means to rotate said shaft in said opposite direction of rotation thereof.

8. An actuator as claimed in claim 7, wherein said valve member is a rod and wherein said guide member is a tube, the rod and the tube being concentrically arranged, movement of the rod axially of the tube being remotely controllable.

9. An actuator as claimed in claim 4, wherein means defining an aperture are provided in said one guide member and means defining apertures are provided in said other guide member, means associated with one end of said one guide member premissive of the supply to and the exhaust from said one guide member of said fluid pressure, said one aperture in said one guide member being so located axially of said one guide member that said fluid pressure is simultaneously applied to each of the two pistons, spring means located between each of said pistons on the one hand and said means defining said chambers on the other hand, simultaneous movements of said pistons away from each other under the influence of said fluid pressure applied to said pistons by way of said one aperture compressing said spring means and storing power therein, and simultaneous movements of said pistons towards each other upon exhaust of said fluid pressure from said one guide member by way of said one aperture being effected under the influence of the power stored in said spring means.

10. An actuator as claimed in claim 4, wherein said two chambers constitute opposed parts of a continuous cylindrical chamber, said means defining said two chambers being constituted by an open-ended cylindrical body, end caps closing the ends of said cylindrical body, means defining two apertures in each end cap, the ends of said guide members extending into the apertures in said end caps, fixing means engaging not only the ends of each of said guide members but also said end caps thereby to render said cylindrical body, said guide members and said end caps a unitary structure, means in one of said fixing means permissive of the supply to and the exhaust from the respective guide member of said fluid pressure, means defining an aperture in said respective guide member, an intermediate chamber in said continuous cylindrical chamber, said intermediate chamber being defined by said pistons in first rest positions thereof in said two chambers, said one aperture in said respective guide member communicating with said intermediate chamber, spring means located between each piston and the respective end cap, supply of said fluid pressure to said intermediate chamber by way of said respective guide member and said one aperture therein effecting simultaneous movements of said pistons from said first rest positions thereof away from each other towards said end caps into second rest positions thereof and simultaneous compression of said spring means to store power therein, exhaust of said fluid pressure from said respective guide member effecting simultaneous movements of said pistons from said second rest positions thereof to said first rest positions thereof under the influence of the power stored in said spring means, locating means carried by each end cap, the spring means located between each piston and the respective end cap consisting of a set of springs one end of each spring being in pressure relationship with the respective piston and the other end of each spring being in engagement with one of said locating means carried by the respective end cap.

11. An actuator as claimed in claim 10, wherein said locating means consists of an axially extending recess in said end cap.

12. An actuator as claimed in claim 11, wherein each spring of each set consists of a single helical compression spring.

13. An actuator as claimed in claim 11, wherein each spring of each set consists of a pair of helical compression springs nested one within the other, the helix of said one spring of said pair of springs being wound in a sense opposite to that in which the helix of said other spring of said pair of springs is wound.

14. An actuator as claimed in claim 1, wherein said means permissive of the application of fluid pressure to said pistons includes means defining an aperture in said one guide member and means defining two axially separated apertures in said other guide member, an intermediate chamber defined by and located between said pistons in first end positions thereof, said intermediate chamber being in communication with said one aperture in said one guide member, each of said two chambers being in communication with the respective one of said two axially separated apertures in said other guide member, a first valve permissive of the application of said fluid pressure to said pistons by way of said two apertures in said other guide member to effect simultaneous movements of said pistons in a first sense along said two chambers to said first end positions thereof, a second valve permissive of the application of said fluid pressure to said pistons by way of said one aperture in said one guide member to effect simultaneous movements of said pistons in a second sense opposite to said first sense to second end positions thereof, and indicating means operable in dependence upon which end positions of said first and said second end positions of said pistons are occupied by said pistons to indicate the condition of said output shaft.

15. An actuator as claimed in claim 14, wherein said two chambers constitute opposed parts of a continuous cylindrical chamber, said means defining said two chambers being constituted by an open-ended cylindrical body, end caps closing the ends of said cylindrical body, means in each end cap for the support of the respective ends of the two guide members, means defining an axially extending bore in one of said end caps, means defining at least five passageways in said one end of each of said five passageways being in communication with said bore, a sleeve-like element extending into said bore, means defining axially separated ports in said element, and a remotely controllable spool valve displaceable along and within said element in a first sense to cause movements of said pistons under the influence of said fluid pressure to said first end positions thereof and in a second sense opposite to said first sense to cause movements of said pistons under the influence of said fluid pressure to said second end positions thereof.

16. An actuator as claimed in claim 15, wherein displacement of said spool valve in said first sense along and within said element permits said fluid pressure to be applied by way of a first passageway and a second passageway of said five passageways and by way of said two apertures in said other guide member to said pistons to cause said pistons to be moved in said first sense along said two chambers to said first end positions thereof and simultaneously permits said intermediate chamber to become exhausted by way of said one aperture in said one guide member and by way of a third passageway and a fourth passageway of said five passageways; and wherein displacement of said spool valve in said second sense permits said fluid pressure to be applied by way of said first passageway and said third passageway of said five passageways and by way of said one aperture in said one guide member to said pistons to cause said pistons to be moved in said second sense along said two chambers to said second end positions thereof and simultaneously permits said two chambers to become exhausted by way of said two apertures in said other guide member and by way of said second passageway and the fifth passageway of said five passageways.

17. An actuator as claimed in claim 16, wherein a solenoid is mounted on said one of said end caps, an armature in said solenoid, said armature being connected to said spool valve, spring means associated with said solenoid and in pressure relationship with said armature, displacement of said spool valve in each of said first sense and said second sense along and within said cylinder being effected under the control of said solenoid, energisation of said solenoid causing displacement of said spool valve in said second sense against the influence of and storing power in said spring means and de-energisation of said solenoid permitting displacement of said spool valve in said first sense under the influence of the power stored in said spring means.

18. An actuator as claimed in claim 15, wherein switch devices separated from one another axially of said actuator are mounted on said one of said end caps, and wherein a switch-operating means is carried by one of said pistons.

References Cited

UNITED STATES PATENTS

| | | | |
|---|---|---|---|
| 955,896 | 4/1910 | Morrison | 91—186 |
| 1,667,559 | 4/1928 | McCaleb | 92—69 |
| 2,848,056 | 8/1958 | Herbenar | 91—186 |

PAUL E. MASLOUSKY, *Primary Examiner.*